INVENTORS.
Mehmed Yusuf Borvali
Paul Grolla
Pierre Hubscher
Francis Reynaud
BY Webb, Mackey & Burden

THEIR ATTORNEYS

United States Patent Office 3,107,977
Patented Oct. 22, 1963

3,107,977
PROCESS OF SULPHONITRIC ATTACK OF ARSENIURETED AND / OR SULPHARSENIURETED ORES OR MATERIALS, PARTICULARLY OF COBALT AND/OR OF NICKEL
Mehmed Yusuf Borvali, Petit-Quevilly, Paul Grolla, Pombliere, Pierre Hubscher, Petit-Quevilly, and Francis Reynaud, Pombliere, France, assignors of two-thirds to Societe d'Electro-Chimie d'Electro-Metallurgie et des Acieries Electriques d'Ugine, and one-third to Societe de Produits Chimiques Bozel-Maletra, both of Paris, France, both corporations of France
Filed Apr. 19, 1956, Ser. No. 579,176
Claims priority, application France Apr. 22, 1955
1 Claim. (Cl. 23—144)

It is known to attack arseniureted and/or sulpharseniureted ores, particularly of cobalt and/or nickel, by an acid or an oxidizing acidic mixture, for example sulphuric acid, nitric acid, or a mixture of the two acids, to obtain the metals contained in the ore as salts in a solution.

The present invention involves a process of placing arseniureted and/or sulpharsenuireted ores or materials, particularly of cobalt and/or of nickel, in suspension in sulphuric acid and progressively adding nitric acid to oxidize the arsenic and metals. The rate of oxidation is controlled by continuously measuring the oxidation potential of the suspension. At least some of the arsenic in the ore or material is removed as $As_2O_3$ by cooling the suspension.

Figure 1:
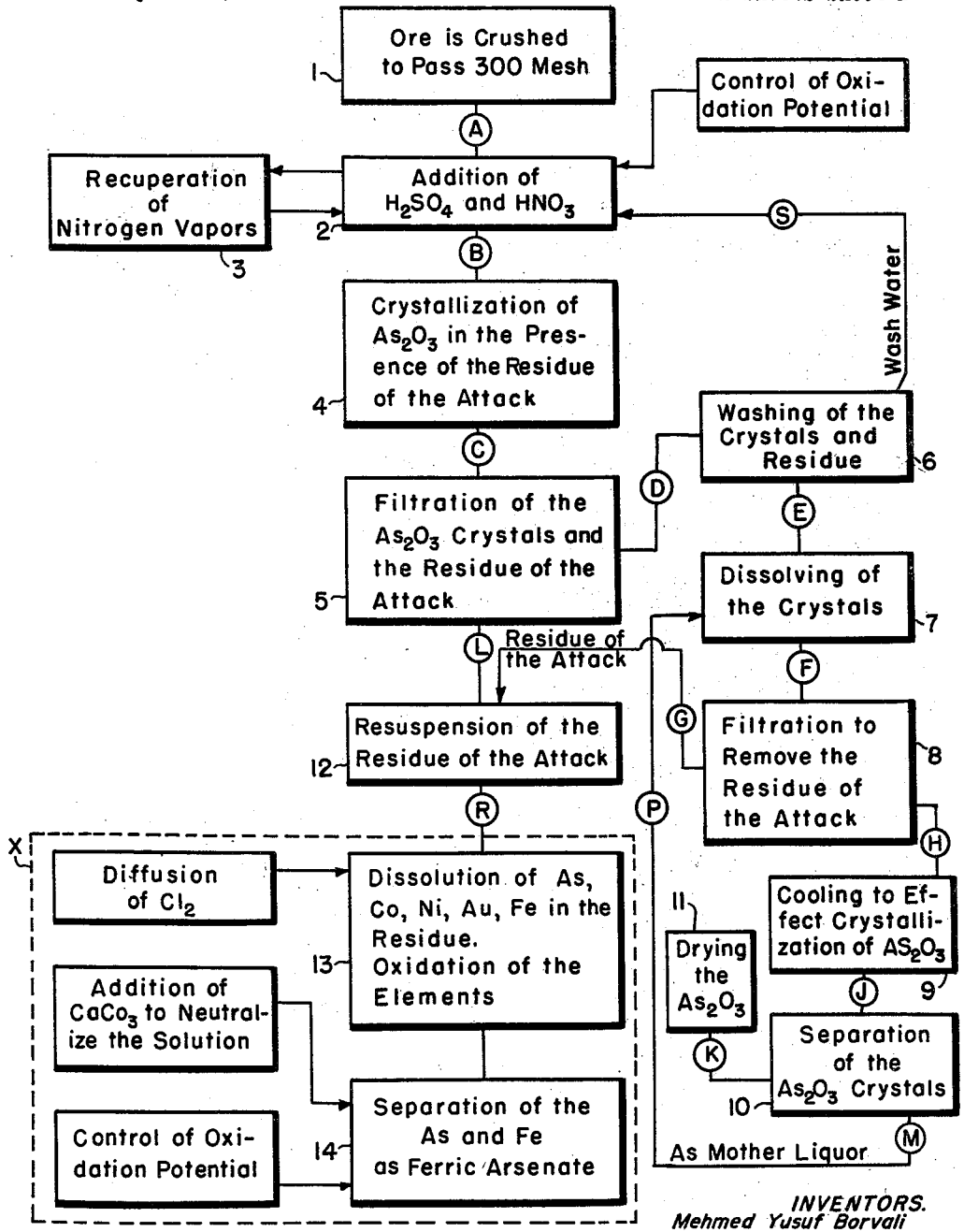
Figure 2:
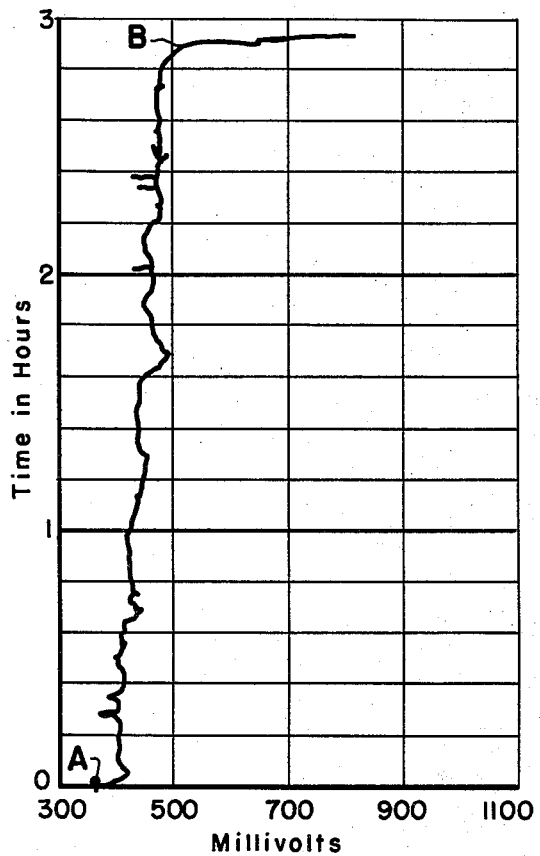

In the accompanying drawings which illustrate a preferred embodiment of our invention, FIGURE 1 is a flow sheet illustrating the present process; and FIGURE 2 is a typical curve representing the oxidation potentials of the ore suspension during the course of the treatment of an ore according to the present invention. The abscissas designate millivolts and the ordinates designate time in hours.

The process according to the invention is carried out in the following way, which is illustrated, in the case of the treatment of arseniureted ore of cobalt and/or of nickel, by the diagram on FIGURE 1. The ore is crushed to pass preferably through a 300 mesh sieve (box 1). The crushed ore is passed (A) to a reactor where it is placed in suspension in sulphuric acid sufficient in quantity to transform most of the metals into sulphates and provide an excess of acid of about 20 to 40 grams per liter. The excess acid maintains the cobalt, and nickel and iron in solution. Nitric acid is introduced, preferably in a continuous manner, in a sufficient amount to provide the oxygen required for the oxidation and the concomitant solubilization of the constituting elements of the ore (box 2). The progress of the oxidation is continuously followed, for example, by means of a chain of platinum-saturated calomel electrodes immersed in the reactive medium (this control is described in application No. 579,173, filed April 19, 1956, now U.S. Patent No. 2,835,569. The diagram of FIGURE 2 represents an example of this control. The potential increases slowly in the course of the attack so long as raw ore is still present. When substantially all of the reducing materials in the ore have been oxidized and dissolved there is a rapid increase in the potential beginning at point B of this curve. The addition of nitric acid to the slurry is then stopped. The lines between points A and B illustrate the minor fluctuation of the potential during the dissolution of the ore.

The object of such a controlled oxidation is to limit the addition of nitric acid to an amount just sufficient to promote a limited oxidation of the arsenides in the ore. This brings about the complete dissolution of the elements, particularly cobalt, nickel, iron, arsenic, contained in the treated material by the sulphuric acid. The object of this limited oxidation is to prepare for the subsequent separation in the form of $As_2O_3$ of any excess arsenic present which is not necessary to maintain the weight ratio of iron to arsenic near 1 and which excess thus will not be necessary in the subsequent formation of ferric arsenate. This control of the potential also determines the end of the reaction.

At the time of the ore oxidation, the nitric acid is reduced to a state of oxygenated compounds of nitrogen, namely, of nitrous vapors. These vapors evolve from the suspension and may be collected and regenerated by the effect of air in an adjacent device (box 3) and used to produce the nitric acid which will be recycled in the operation.

The reaction of the attack being ended, the solution is allowed to cool to allow the crystallization of the $As_2O_3$ formed (box 4). The solution is then moved, as shown by C, to a filtration unit where the crystals of $As_2O_3$ and the undissolved residue of the ore are removed simultaneously (box 5). The $As_2O_3$ crystals and the residue are moved, as shown at D, to be washed with cold water to eliminate any solubilized cobalt and/or nickel adhering thereto (box 6). The wash water is removed at S and returned to be used in forming another suspension of ore (box 2). The crystals and residue are then moved, as shown at E, to a dissolving tank where they are treated with the arsenic mother-water from a preceding operation of crystallization which will dissolve and extract the $As_2O_3$ from the residue (box 7). The residue from the original acid attack will not dissolve in this arsenic mother-liquor. The solution containing the $As_2O_3$ and the residue of the acid attack is then moved (F) to a filtration unit where it is filtered and the residue (which is retained on the filter) is washed with boiling water to extract therefrom any $As_2O_3$ with which it was still impregnated (box 8). The residue of the acid attack is removed at G to box 12 for further processing which will be described hereinafter. The filtrate which contains only $As_2O_3$ is removed at H to a cooling unit to allow the crystallization of the $As_2O_3$ (box 9). Normally the solution is cooled to a temperature below 25° C. to allow proper crystallization. The wash water from the filtration in box 8 is joined with this original solution containing the $As_2O_3$. This combined solution contains about 80 grams of $As_2O_3$ per liter. The solution is moved (J) to a unit for the separation of pure wet $As_2O_3$ crystals (box 10). These wet $As_2O_3$ crystals are moved (K) to a drying unit and there dried for ultimate sale (box 11). The dried crystallized $As_2O_3$ is 99.8% pure.

The arsenic mother-liquor which is the filtrate from box 10 leaves box 10 as shown at M and is returned to box 7 for the dissolution of the next batch of $As_2O_3$ crystals.

The solution coming from box 5 as shown at L contains substantially all of the cobalt, nickel and iron contained in the initial ore and any arsenic which was not crystallized out as $As_2O_3$.

The residue G coming from the filtration of box 8 is now free from $As_2O_3$, but still contains 1.5 to 2% cobalt and nickel and the noble metals, if there were any in the starting ore. If the residue G does not contain any precious metals, it may be thrown away. But if further processing is advisable or desirable, owing to the presence of precious metals for example, this residue G is resuspended in the solution as shown in box 12.

The suspension is then moved as shown at R to the next step illustrated in box 13 which is the diffusion of chlorine into the solution. The chlorine solubilizes the cobalt, nickel and the arsenic which are still in the residue in the form of unattacked arsenides, oxidizes the arsenic into arsenic acid and dissolves and maintains in solution the precious metals.

Calcium carbonate is subsequently added to this oxidized solution to neutralize the latter and precipitate the arsenic and iron as ferric arsenate. A 1 to 1 weight ratio is necessary between the arsenic and iron at this point to properly precipitate ferric arsenate. The necessary control of the oxidation potential and a complete description of this portion of the process are shown inside box X and are fully described in patent application No. 579,173, filed April 19, 1956, now U.S. Patent No. 2,835,569.

The process according to the invention provides, not only for the recovery of the arsenic as substantially pure $As_2O_3$, but a simple and convenient control of the acid attack on the ore and a continuous operation.

*Example*

500 kilograms of a rew smaltine of a composition comprising substantially: Co=10.82%, As=52.8%, Fe=8.14%, Ni=1.14%, and Au=13.8 grams per metric ton, were put in suspension in 400 liters of wash water coming from a preceding operation (S). 200 kilograms of sulphuric acid, calculated as a monohydrate (box 2), were then added.

A portion of the suspension, contained in the reactor, was continuously removed therefrom and sent to a measurement cell in which were immersed a chain of platinum-saturated calomel electrodes connected with a measurement amplifier followed by a registering device. The sample liquid was returned to the reactor. Nitric acid at 36° Bé. was then added at the rate of 200 liters per hour. The heat generated by the reaction was sufficient to maintain the temperature of the medium at a value of about 95° centigrade. The oxidation potential rose slowly from 300 millivolts to about 500 millivolts. At this latter value, the potential rapidly increased to about 800 millivolts and remained there. At that moment, the addition of nitric acid was stopped.

The total amount of nitric acid added was 550 liters and the reaction lasted about three hours.

The solution was allowed to cool and was then filtered. 900 liters of filtrate was obtained which was placed aside for later use.

The crystallized products and the acid attack residue on the filter were washed with cool water to remove any cobalt or nickel which had adhered thereto, and the wash water was put aside for use in another operation of the process. The crystallized product was again put into suspension for two hours in 5400 liters of arsenical mother-water (M) at 100° centigrade. The arsenical mother-water initially contained 25 grams of $As_2O_3$ per liter of solution. This solution dissolved the $As_2O_3$ crystals but did not dissolve much of the residue of the attack.

This solution was then filtered when hot and the attack residue which was retained on the filter was washed with 250 liters of water at 100° centigrade. The wash water was joined with the filtrate from the filtration step. The residue on the filter was dried and weighed. 120 kilograms of dry product was obtained which contained about 0.9% cobalt, thus indicating a solubilization yield of 98% cobalt.

The combined filtrate and wash water were allowed to cool and thus crystallization of the $As_2O_3$ was brought about. Upon centrifuging this solution, 295 kilograms of crystallized $As_2O_3$ were obtained.

The dearsenated residue (G) of the attack left on the filter was then put in suspension in the initial mother-water which had previously been placed aside from box 5. The temperature of the suspension was brought to 75° C. and chlorine was diffused through it. Control of the oxidation potential was maintained by a chain of platinum-saturated calomel electrodes, until all the elements present in the medium were at their maximum valance and a slight excess of chlorine was present. The appearance of this excess was revealed by a sudden increase in the oxidation potential. The potential was then stabilized at a value slightly above 1000 millivolts and maintained there for three hours to dissolve the gold.

The suspension was then filtered and the residue washed. The dry weight of the residue on the filter was 100 kilograms and was comprised of 0.19% cobalt and 3.2 grams of gold per metric ton.

99.65% of the cobalt and 95.35% of the gold had been solubilized.

Calcium carbonate was added to the filtrate and the oxidation potential was controlled as described in application No. 579,173, filed April 19, 1956, now U.S. Patent No. 2,835,569. The arsenic and iron were thus precipitated as ferric arsenate. The solution was then further processed to recover the metals from it.

The invention is not limited to the preferred embodiment but might be otherwise embodied or practiced within the scope of the following claim.

We claim:

A one-step process of extracting arsenic from arseniureted and sulfarseniureted ores containing nickel, cobalt and large amounts of arsenic, which process consists essentially of introducing said ore in powdered form into a sulphuric acid solution; said sulphuric acid being present in an amount slightly in excess of the amount sufficient to dissolve said nickel and cobalt; said process being performed at atmospheric pressure and about room temperature; thereafter slowly and progressively adding only nitric acid to said solution with continuous agitation; continuously controlling the addition of nitric acid to maintain the oxidation potential of the solution solely in the limited range 300–500 millivolts during the nitric acid addition until substantially all of the metals in the ore are dissolved and substantially all the arsenic in the ore is oxidized to arsenous oxide; stopping the nitric acid addition as soon as the oxidation potential of the solution suddenly increases to a value greater than 500 millivolts; cooling the solution to crystallize out only the arsenous oxide; filtering the solution to remove a solid containing the crystallized arsenous oxide and any insoluble residue of the ore from a filtrate; further processing the filtrate to remove the metals therefrom, and the solid to separate arsenous oxide therefrom.

References Cited in the file of this patent

UNITED STATES PATENTS

| | | |
|---|---|---|
| 1,447,203 | Ellis et al. | Mar. 6, 1923 |
| 1,512,733 | Wescott | Oct. 21, 1924 |
| 1,863,807 | Schopper | June 21, 1932 |
| 1,992,053 | Boller | Feb. 19, 1935 |
| 2,682,114 | McGauley et al. | Aug. 10, 1954 |
| 2,805,936 | Schaufelberger | Sept. 10, 1957 |
| 2,835,569 | Reynand et al. | May 20, 1958 |

OTHER REFERENCES

Latimer in "The Oxidation States of the Elements and Their Potentials in Aqueous Solutions," published by Prentice-Hall, Inc., New York, 1938, pp. 2, 3 and 103–107.